United States Patent
Akkaraju et al.

(10) Patent No.: US 6,473,545 B2
(45) Date of Patent: Oct. 29, 2002

(54) MICROMECHANICAL OPTICAL SWITCH

(75) Inventors: Sandeep Akkaraju, Lexington, MA (US); Carlos Mastrangelo, Andover, MA (US); Nan Iyer, Cambridge, MA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/083,019

(22) Filed: Feb. 26, 2002

(65) Prior Publication Data

US 2002/0102047 A1 Aug. 1, 2002

Related U.S. Application Data

(62) Division of application No. 09/645,203, filed on Aug. 25, 2000, now Pat. No. 6,411,754.

(51) Int. Cl.⁷ .................................................. G02B 6/26
(52) U.S. Cl. ............................. 385/22; 385/15; 385/16; 385/3; 385/4; 385/7
(58) Field of Search ............................. 385/22, 15, 16, 385/3, 4, 2, 7, 40, 14, 18, 39

(56) References Cited

U.S. PATENT DOCUMENTS

| | | | |
|---|---|---|---|
| 5,262,000 A | 11/1993 | Welbourn et al. | 156/643 |
| 5,329,601 A | 7/1994 | Nakamura | 385/41 |
| 5,446,811 A | 8/1995 | Field et al. | 385/23 |
| 5,870,351 A | 2/1999 | Ladabaum et al. | 367/163 |
| 5,945,898 A | 8/1999 | Judy et al. | 335/78 |
| 5,971,355 A | 10/1999 | Biegelsen et al. | 251/129.06 |
| 5,998,303 A | 12/1999 | Sato | 438/758 |
| 6,042,391 A | 3/2000 | Bodö et al. | 439/74 |
| 6,068,801 A | 5/2000 | Bodö et al. | 264/39 |
| 6,069,392 A | 5/2000 | Tai et al. | 257/419 |
| 6,071,809 A | 6/2000 | Zhao | 438/634 |
| 6,268,952 B1 | 7/2001 | Godil et al. | 359/291 |

FOREIGN PATENT DOCUMENTS

WO    WO 00/25160    5/2000

OTHER PUBLICATIONS

Cros, F. and Allen, M.G., "High Aspect Ratio Structures Achieved By Sacrifical Conformal Coating," *Solid–State Sensor and Actuator Workshop*, Hilton Head Island, South Carolina, Jun. 8–11, 1998.

Hui, E.E., et al., "Carbonized Parylene As A Conformal Sacrificial Layer," *Solid–State Sensor and Actuator Workshop*, Hilton Head Island, South Carolina, Jun. 8–11, 1998.

*Primary Examiner*—Mohammad Sikder
(74) *Attorney, Agent, or Firm*—Hamilton Brook Smith & Reynolds, P.C.

(57) ABSTRACT

The present invention relates to optical MEMS components, and in particular, to a micromechanical optical switch. A removable layer is used during fabrication to define the gap between optical waveguides and a moveable element in the form of a mirror that is moved between states. This provides a high speed, low-power optical switch that is readily manufacturable.

9 Claims, 9 Drawing Sheets

MICROMECHANICAL OPTICAL SWITCH

RELATED APPLICATIONS

This application is a divisional of application Ser. No. 09/645,203 filed Aug. 25, 2000 U.S. Pat. No 6,411,754. The entire teachings of the above-referenced application are incorporated herein by reference.

BACKGROUND OF THE INVENTION

Optical switches have been developed using guided wave devices or free-space mechanical devices. Guided wave devices use waveguides, whereas free-space devices use optical beams in free space with movable optical elements such as mirrors or lenses.

Guided wave devices typically divert light from one arm of the device into the other by changing the refractive index of one of the arms of the device. This is typically done using electrical, thermal, or some other actuating mechanism.

The free-space approach has an advantage over the guided-wave approach in some applications. It has very low cross talk because the waveguides are physically isolated from one another and coupling cannot occur. The principal source of cross talk in this approach is scattering off the movable optical element. In addition, free-space devices are wavelength-independent and often temperature-independent.

Existing designs employ mirrors positioned at the intersection of input fibers and output fibers. Due to the spreading of the light beam as it leaves the waveguide and travels toward the mirror large mirrors are used that require mounting and angular placement accuracy. There can be significant difficulty in actuating such a relatively large structure quickly and accurately at the switching speeds required for optical communication systems.

Thus, a need exists for an optical switch having the advantages of the free-space approach, without the disadvantage of existing designs.

SUMMARY OF THE INVENTION

The present invention relates generally to the field of optical MEMS (micro-electro-mechanical system) and more specifically to the use of fabrication techniques used in making micromechanical devices to fabricate high speed optical MEMS for optical communication networks. The method employs the use of a removable layer that is formed between an optical waveguide and a movable switch element that has been formed over the removable layer and the waveguide. The removable or sacrificial layer is preferably formed using a conformal material such as parylene (poly-para-xylene).

A preferred embodiment of the invention can use a silica substrate with optical waveguides formed therein as the initial structure in the manufacture of the optical MEMS. After formation of a trench in the substrate to define a gap between waveguide elements, a first mask is used to define the routing wire geometry on the upper surface of the substrate. The trench can have a width of about 3 to 20 µm. Subsequently the removable layer is formed followed by the use of a second mask for fabrication of a switch element layer.

After patterning of the switch element layer, a spacer layer, preferably a photoresist layer, is spun on the surface and patterned using a third mask. A metallization layer, preferably an evaporated layer of copper, is deposited and a further photoresist layer is formed using a two mask exposure sequence. This defines a mold for fabrication of a plating layer. In a preferred embodiment of the invention, nickel is electroplated into the mold to form an integral electrode structure.

The removable layer is then preferentially etched to release the switch element which has been fabricated with a spring that supports the switch relative to the substrate. The characteristics of the spring define the speed and pull-up voltage of the switch element.

The electrodes are used with an overlying actuating electrode structure to actuate movement of the switch element between states. A preferred embodiment of the invention uses a reflective element or mirror that is moved from a first position, in which light from a first waveguide is reflected by the mirror into a second waveguide, to a second position in which the mirror is translated vertically to permit light to pass through the gap on a linear optical path into a third optical fiber that is aligned along a single axis with the first fiber. The waveguides and/or the trench can be filled with air or in another embodiment can be filled with a fluid. Further details regarding the use index matching fluids are described in International Application No. PCT/US99/24591 filed on Oct. 20, 1999, the entire contents of which is incorporated herein by reference.

Another preferred embodiment of the invention involves the fabrication of an array of switches on a single substrate that can serve as a monolithic array, or alternatively, the substrate can be diced to provide separate switches or arrays of switches.

Figure 1A:
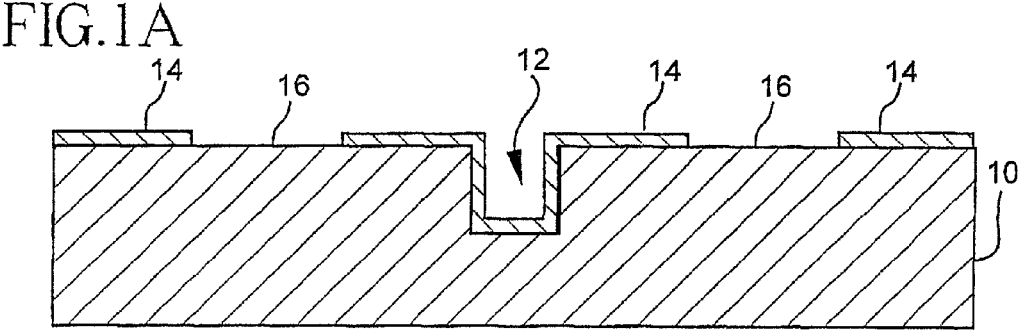
FIGS. 1A–1K illustrate a method of fabricating an optical switch in accordance with the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A preferred method of fabricating a micromechanical optical switch is illustrated in the process sequence of Figures 1A–1K. This method begins with a substrate 10, such as silica wafer, in which a cavity or trench 12 has been formed by standard etching techniques. As described in detail below, the substrate can include one or more optical waveguides. A first mask pattern is formed for conductive routing lines by depositing a photoresist layer 14 and selectively removing portions thereof to define the metallization pattern 16,18.

Figure 1B:
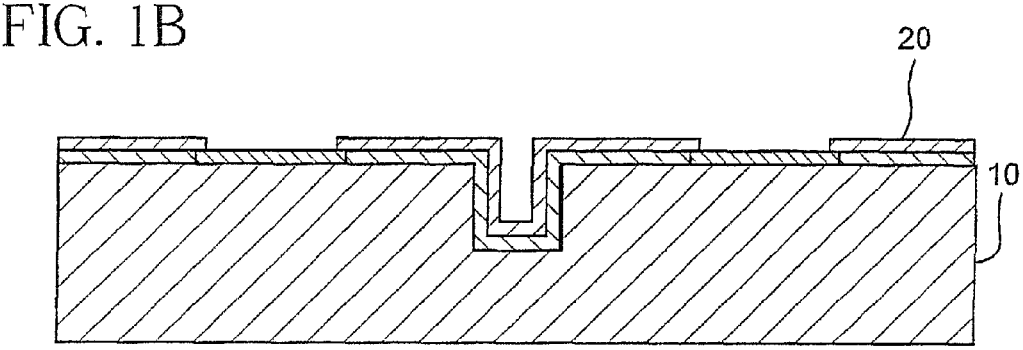
Figure 1C:
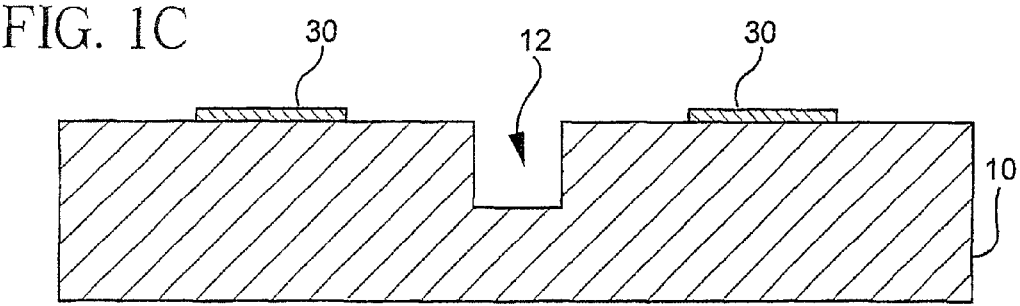
Figure 1D:
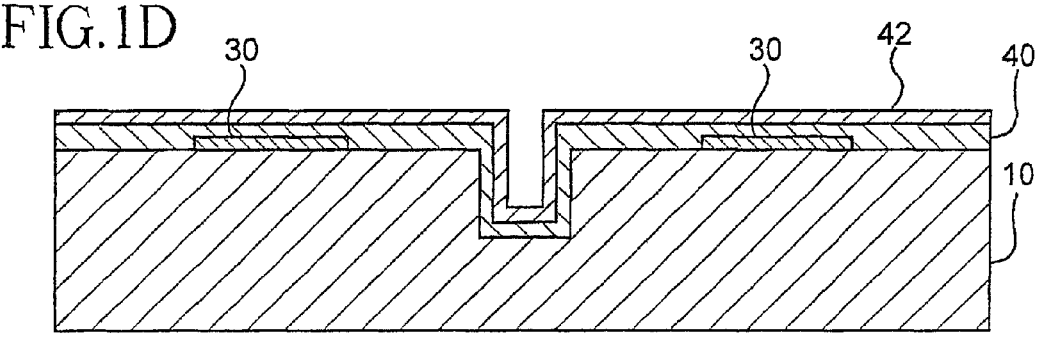

In Figure 1B, a conductor layer 20 is formed, preferably by evaporation of a metal. In a preferred embodiment, a plurality of layers including a titanium layer, a nickel layer and a gold layer are used to provide the desired electrical and mechanical properties. In an example, the titanium layer has a thickness of 500 Å, the nickel layer has a thickness of 1500 Å and the gold layer has a thickness of 3000 Å. A rinse can be used to remove excess metal and the photoresist and overlying metal is than removed to provide conductive routing lines 30 shown in FIG. 1C.

A sacrificial layer 40 is then formed on the device, preferably a layer of parylene having a thickness in the range of 0.5 $\mu$m to 25 $\mu$m, depending on the width of the trench 12. This is followed by a layer 42, of a reflective material such as gold. In this particular example the parylene layer has a thickness of 3.5 $\mu$m and the gold layer is deposited in 0.21 $\mu$m steps for a total thickness of about 2.0 $\mu$m.

Figure 1E:
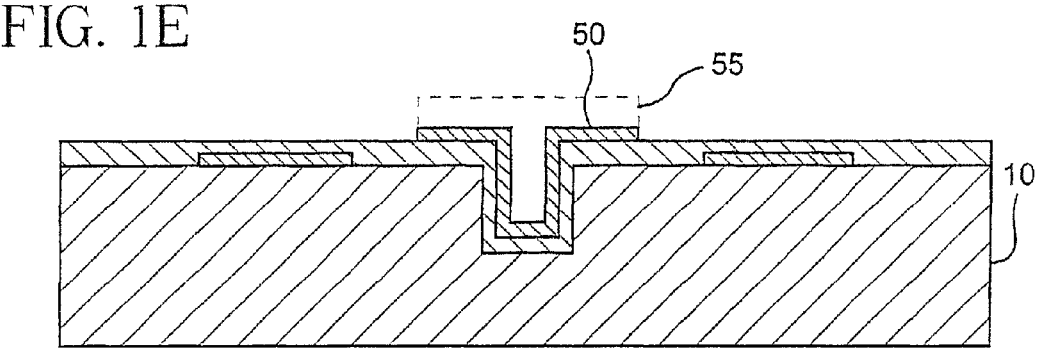
Figure 1F:
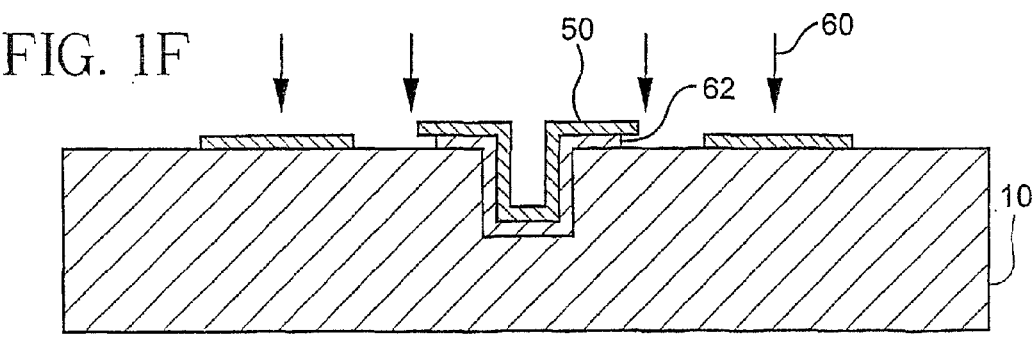

In FIG. 1E, the reflective layer 42 is patterned to form a reflector or mirror 50. A photoresist (AZ9260) is spun, baked, exposed, and developed to define the mask pattern 55 and the exposed gold is removed with a Transene TFA etchant. Next, after removal of the mask, a directional (RIE) etch in an $O_2$ plasma is used to remove the parylene with the mirror 50 acting as a mask and leaving a residual layer 62 as seen in FIG. 1F.

Figure 1G:
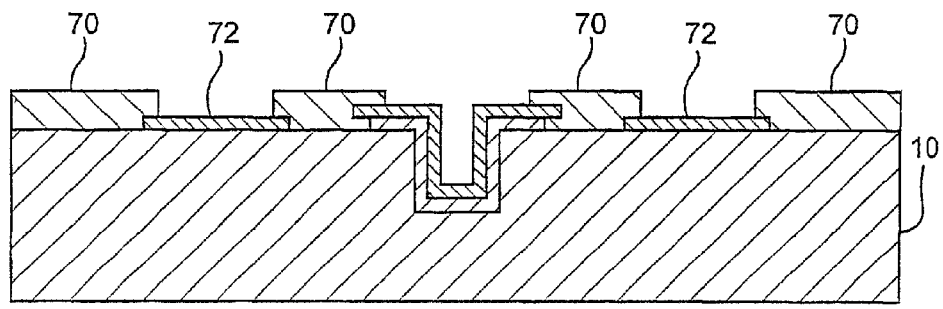

Another photoresist layer 70 is then deposited and patterned to define anchor positions 72 (FIG. 1G). Layer 70 has a specified thickness to define a gap between the suspended structure that will support the mirror relative to the substrate. The gap is preferably in a range between 5 and 20 $\mu$m and in this particular example is about 15 $\mu$m. The size of the anchor openings can be measured to verify proper alignment and preferably each opening has an area in a range between 40 and 50 $\mu m^2$.

Figure 1H:
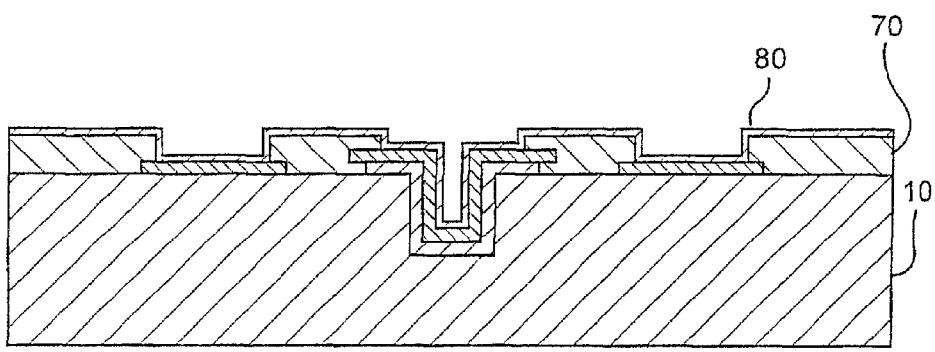

FIG. 1H illustrates formation of a metal seed layer having a thickness in a range of 1000 to 50,000 Å. In this particular example, a copper layer having a thickness of 5000 Å is deposited by evaporation.

Figure 1I:
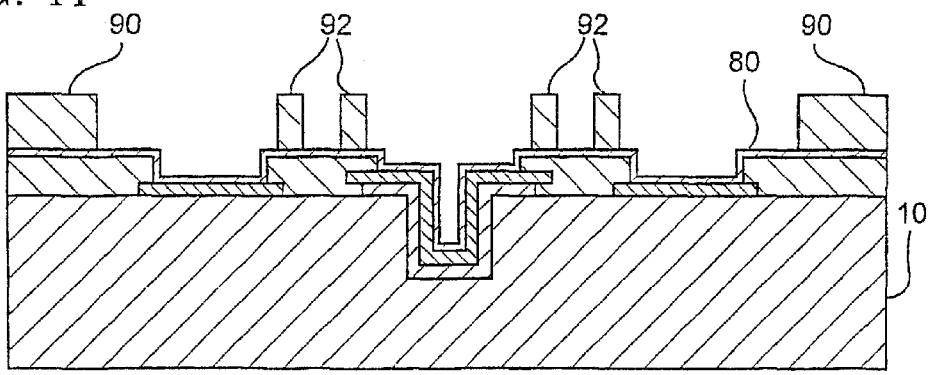
Figure 1J:
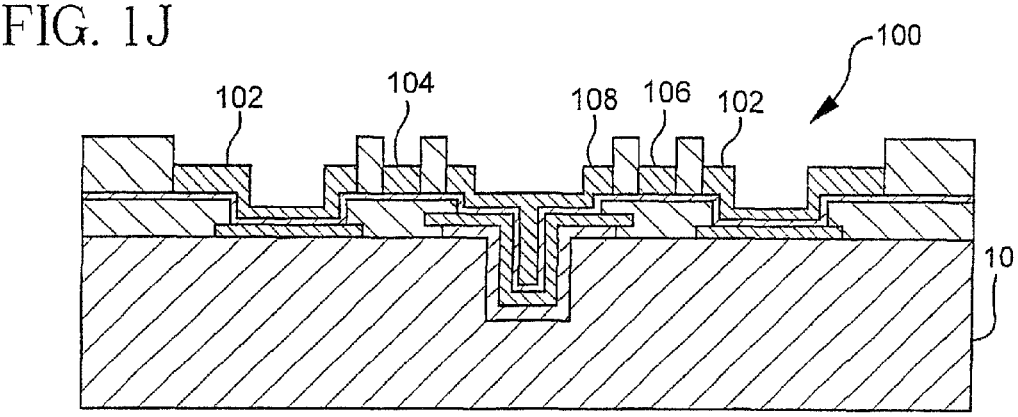

Another photoresist pattern 90 is formed as shown in FIG. 1I using a digitally controlled oven at 45° for 4 hours. A two step exposure sequence is used to minimize variations in thickness of the photoresist. Features 92 of the photoresist layer 90 are used to define electrodes in the suspended membrane that are used in actuating movement of the switch element. As shown in FIG. 1J, a nickel layer 100 is formed, preferably using an electroplating process in which three separate regions, the first region 102 being at the anchor, the second region at electrodes 104, 106 and the third region at the mirror 108. In a preferred embodiment of the invention a nickel sulfate solution is used with a current of 17.5 mA at 45° C. with a plating time of 30 minutes to provide a 6 $\mu$m thick layer.

Figure 1K:
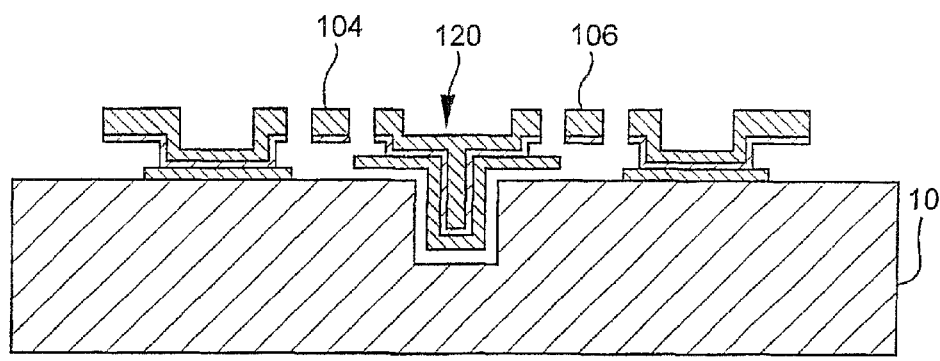

As shown in FIG. 1K, the photoresist 90, 92 is removed, the exposed copper is then etched using ammonium hydroxide and copper (II) sulphate to access the spacer material 70 which is then removed. Finally, a diclorobenzene etch is performed at 150° C. that removes the remaining parylene 61 to release the mirror structure 120.

The above procedure can also be used in fabricating a mirror that can be displaced laterally in the trench using a different method of actuation such as electrostatic comb drive or thermal actuation which can be used to provide a bistable switch, for example.

Figure 2:
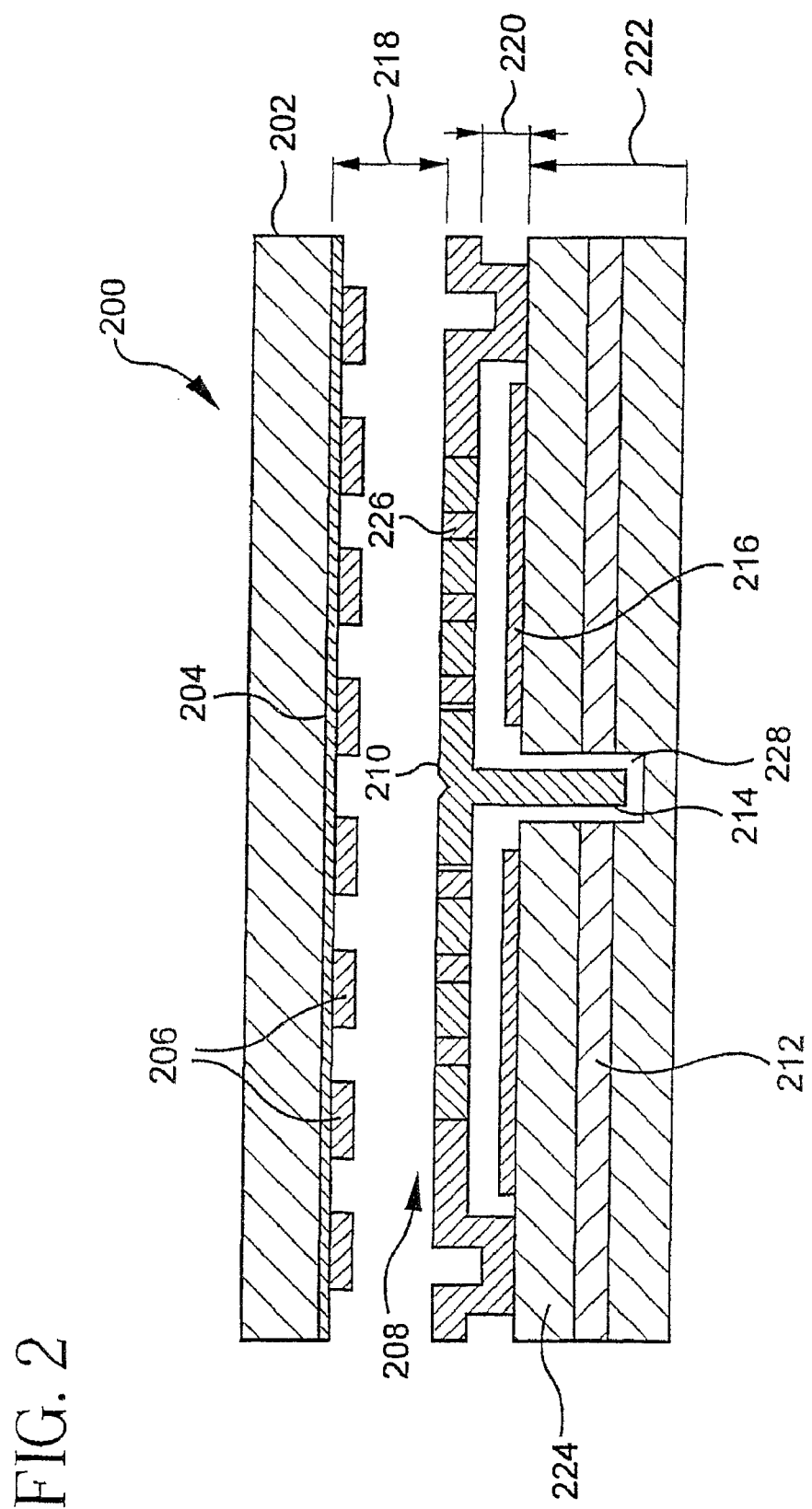
FIG. 2 is a schematic cross-sectional view of a preferred embodiment of an optical switch in accordance with the invention.

Illustrated in the schematic cross-sectional view of FIG. 2 is an optical switch 200 in accordance with the invention. An overlying actuating electrode panel 202 having an actuating electrode 204 that is separated from the suspended membrane 208 by a gap 218 that is preferably about 50 $\mu$m. Spacers 206 can be made using an oxide to prevent shorting between electrodes 204 and 226 or the mirror surface 210.

Note that optional pull down electrodes 216 can also be positioned in the gap 220 between the fiber cladding 224 and the membrane 208 that is preferably about 15 $\mu$m. The substrate has a thickness 222 that includes the cladding 224 surrounding the fiber core 212. The fiber core is preferably about 6 $\mu$m. The mirror includes the switching element 214 that moves vertically within the trench 228. The pitch of the membrane structure is in a range of 100 to 2000 $\mu$m, and is preferably about 500 $\mu$m. The upper panel 202 can be electrically connected to the lower substrate system using flip chip bonding or eutectic bonding. The driver circuit for the switch can be mounted on substrate or packaged separately.

Figure 3:
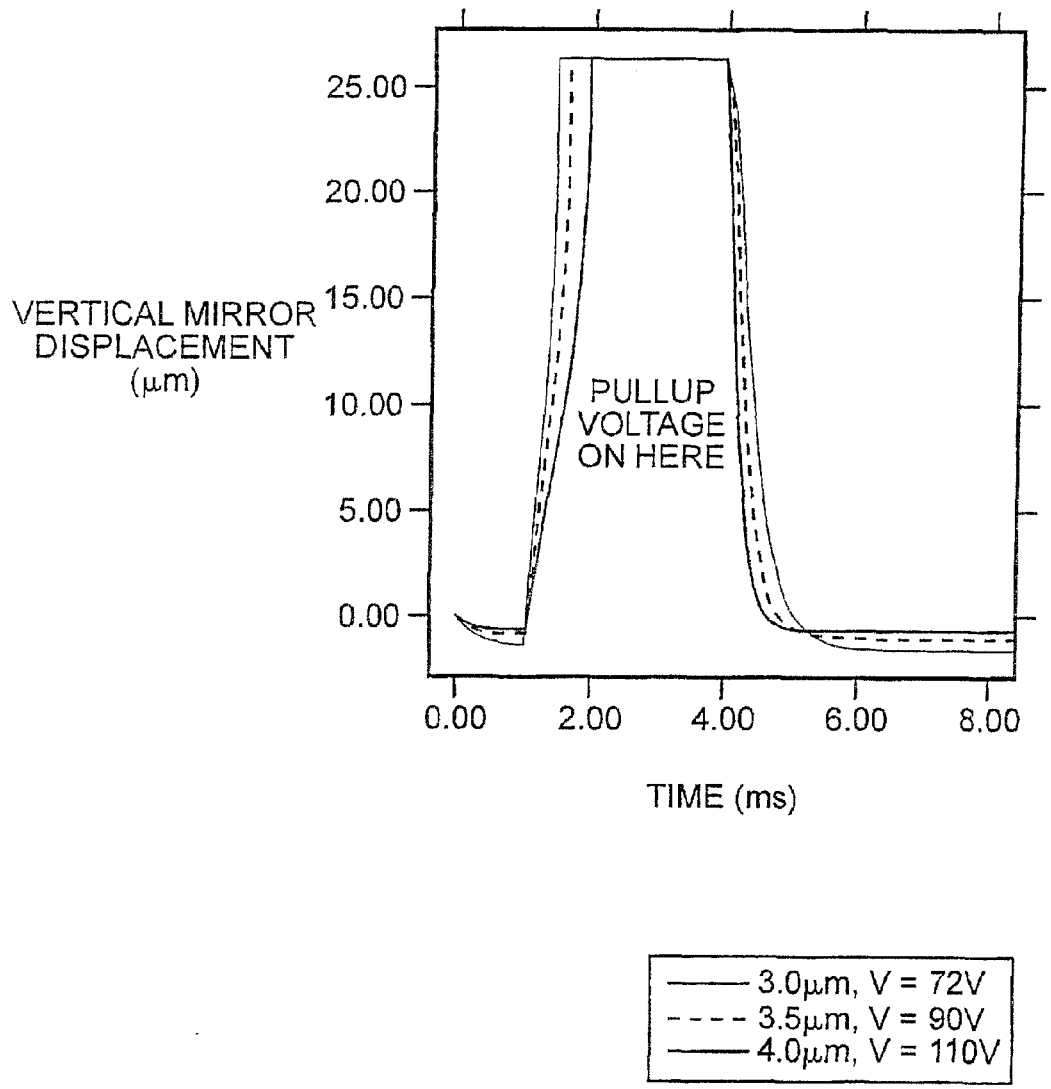
FIG. 3 illustrates the switching time of a preferred embodiment of the invention.

FIG. 3 graphically illustrates the vertical mirror displacement as a function of time for three different pull-up voltages as a function of time.

Figure 4:
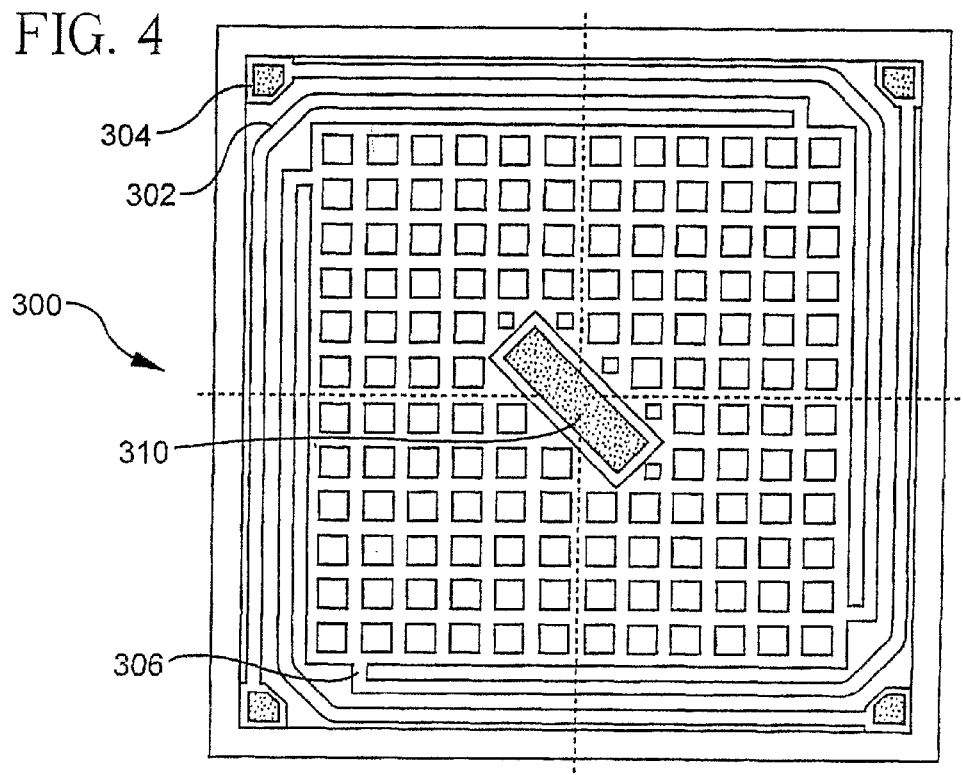
FIG. 4 is a top view of an optical switch in accordance with the invention.
Figure 5:
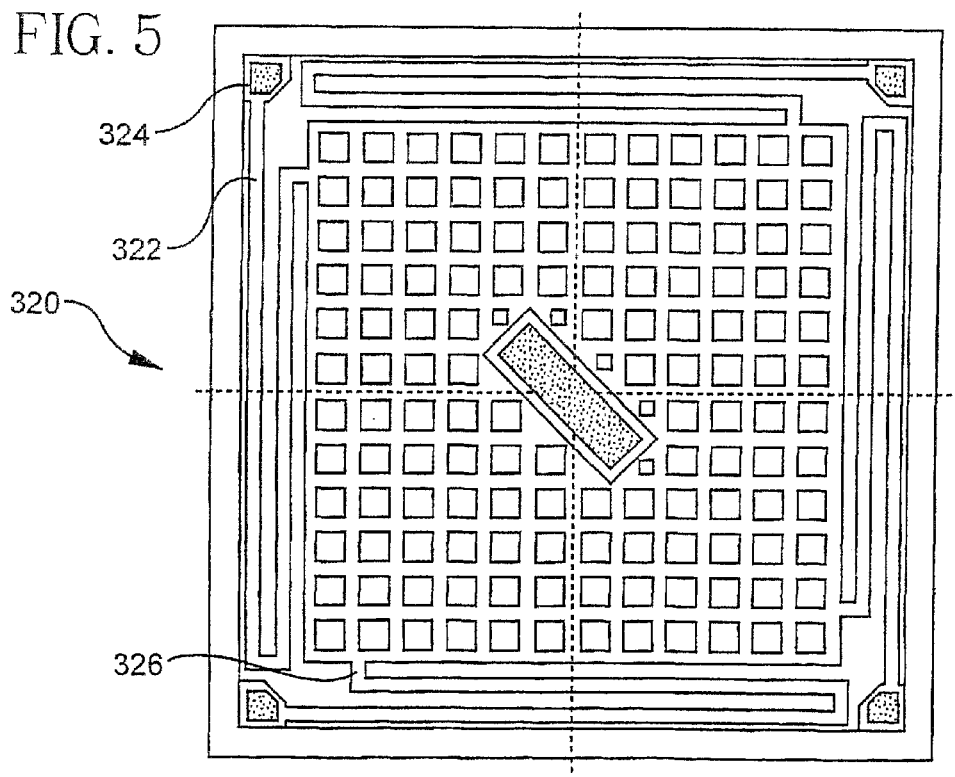
FIG. 5 is a top view of another preferred embodiment of the invention.
Figure 6:
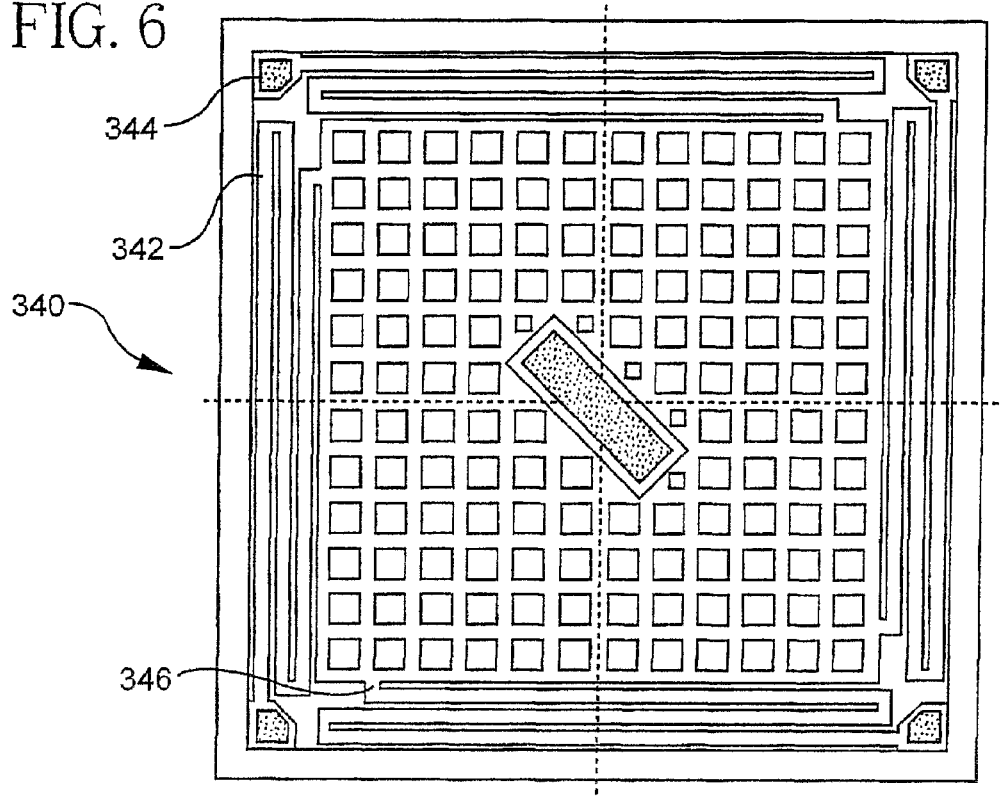
FIG. 6 is a top view of another preferred embodiment of the invention.
Figure 7:
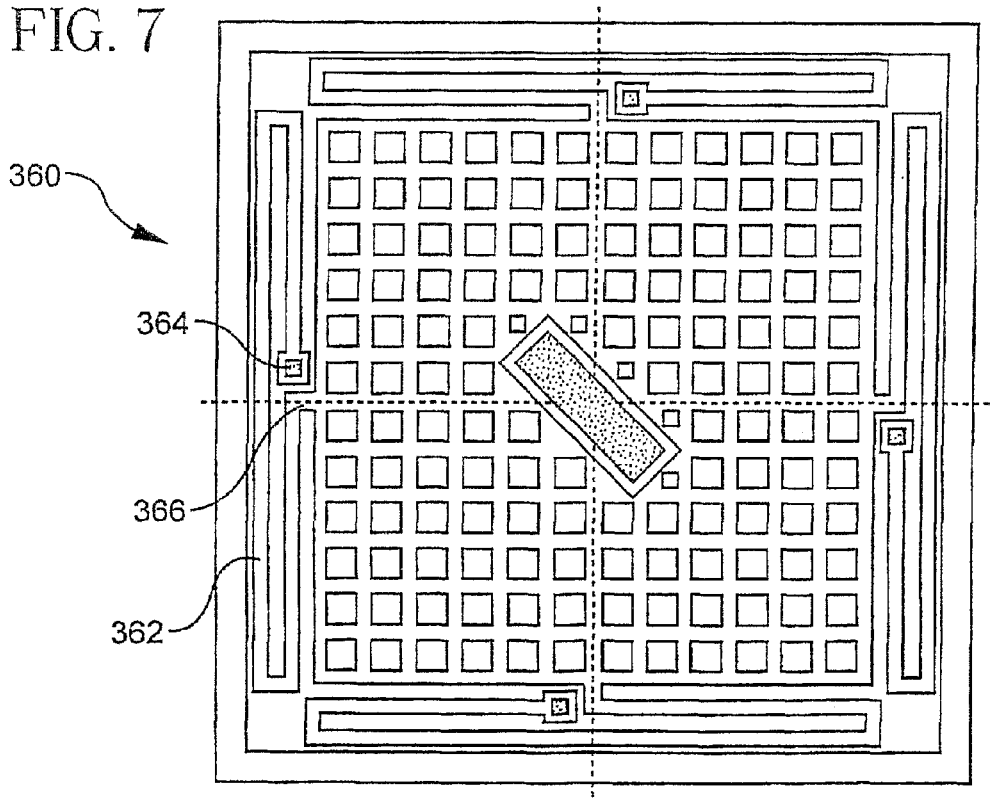
FIG. 7 is a top view of another preferred embodiment of the invention.

FIGS. 4–7 illustrate preferred embodiments of the spring system that supports the membrane relative to the substrate. The spring is configured to provide a vertical displacement of between 20 and 30 $\mu$m. Generally, a higher spring constant in the range of 1.0 to 4.0 N/m along with a higher operating voltage in the range of 50–150V results in a faster response time. It is also desirable to minimize or eliminate rotation of the membrane during displacement. FIG. 4 illustrates a spring system 300 having four beams 302 extending from anchors 304 to a membrane connection 306. This particular embodiment has a stiffness of 1.99 N/m, a rotation of 0.0025 degrees and a spacing of 10 $\mu$m. The spring system 320 of FIG. 5 has four spring elements 322 extending from anchors 324 to membrane connectors 326. This embodiment has a higher stiffness at 4.1 N/m, a smaller rotation at 0.0015 degrees and a 10 $\mu$m spacing. The embodiment 340 of FIG. 6 has four spring elements 342 connected at anchors 344 and connected at 346. The system has a stiffness of 2.8 N/m, a rotation of 0.002 degrees and a smaller spacing at 5 $\mu$m. The system 360 of FIG. 7 has stiffness of 4.49 N/m, no rotation and a 10 $\mu$m spacing.

Figure 8:
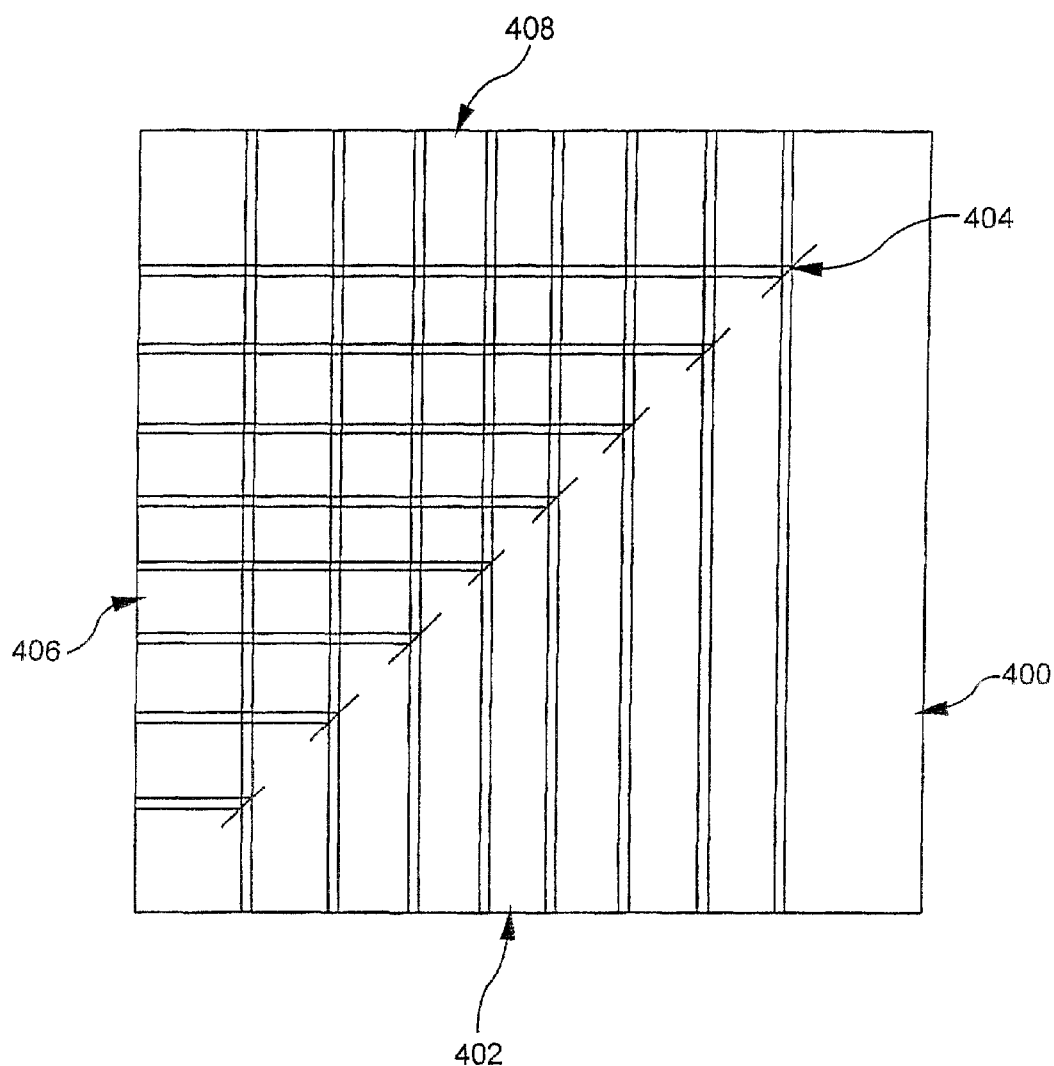
FIG. 8 is an array of optical switches made in accordance with the invention.

FIG. 8 illustrates an array 400 of switches fabricated in accordance with the invention. The array can be 8×8, 32×32, 64×64 or any other desired configuration as needed for a particular application. In this particular embodiment an 8×8 having input fibers 402, a diagonally positioned array of switch elements that either reflect light from the input fibers to output fibers 406, or allow light to pass directly through the trench to output fibers 408. The output fibers 406 can be orthogonally arranged relative to fibers 402, or they can be arranged at some other oblique angle.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical switch comprising:
    a substrate having a first optical waveguide having an output surface and a second optical waveguide having an input surface, the input surface and the output surface being separated by a cavity;

an optical switch element positioned within the cavity and moveable between a first position and a second position; and a spring mounted actuator that moves the optical switch element between the first position and the second position to control transmission of light between the first optical waveguide and the second optical waveguide.

2. The optical switch of claim 1 further comprising a third optical waveguide coupled to the cavity such that the switch element couples light from the first waveguide in the first position.

3. The optical switch of claim 1 further comprising an array of input waveguides and an array of output waveguides, each pair of input and output waveguides having an optical switch element.

4. The optical switch of claim 1 wherein the substrate comprises a silica wafer.

5. The optical switch of claim 1 wherein the optical switch element comprises a reflector.

6. The optical switch of claim 1 wherein the spring comprises a plurality of spring elements attached at a first end to the substrate and at a second end to a moveable beam.

7. The optical switch of claim 1 wherein the spring has a stiffness between 1.0 and 5.0 N/m.

8. The optical switch of claim 1 wherein the switch element moves from the first position to the second position in less than 1 ms.

9. The optical switch element of claim 1 further comprising a control circuit that actuates movement of the switch, the circuit operating at a voltage in a range between 50 to 300V.

* * * * *